(12) United States Patent
Tanaka et al.

(10) Patent No.: US 8,211,221 B2
(45) Date of Patent: Jul. 3, 2012

(54) COLORANT COMPOUND AND INK INCLUDING THE COLORANT COMPOUND

(75) Inventors: Masatake Tanaka, Yokohama (JP); Masashi Kawamura, Tokyo (JP); Yasuaki Murai, Kawasaki (JP); Masashi Hirose, Machida (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 12/577,569

(22) Filed: Oct. 12, 2009

(65) Prior Publication Data

US 2010/0089284 A1 Apr. 15, 2010

(30) Foreign Application Priority Data

Oct. 14, 2008 (JP) ................................. 2008-265178

(51) Int. Cl.
*C09D 11/02* (2006.01)
(52) U.S. Cl. .................. 106/31.48; 106/31.46; 106/31.5
(58) Field of Classification Search .............. 106/31.48, 106/31.46, 31.5; 534/766, 772
See application file for complete search history.

(56) References Cited

U.S. PATENT DOCUMENTS

| | | | | |
|---|---|---|---|---|
| 3,932,122 A | * | 1/1976 | Ramanathan | 534/772 |
| 4,092,308 A | * | 5/1978 | Hegar | 534/766 |
| 4,167,509 A | * | 9/1979 | Parton | 534/772 |
| 4,632,983 A | * | 12/1986 | Lamm | 534/772 |
| 5,093,308 A | * | 3/1992 | Sens et al. | 503/227 |
| 5,204,312 A | * | 4/1993 | Sens et al. | 503/227 |
| 6,533,852 B2 | * | 3/2003 | Hirose | 106/31.48 |
| 6,723,835 B1 | | 4/2004 | Millard | |
| 6,855,195 B2 | * | 2/2005 | Nishita et al. | 106/31.48 |

(Continued)

FOREIGN PATENT DOCUMENTS

| | | |
|---|---|---|
| JP | 2003-510398 T | 3/2003 |
| JP | 2006-071822 A | 3/2006 |

OTHER PUBLICATIONS

English translation of JP 2006/071822; Mar. 2006.*

(Continued)

*Primary Examiner* — Helene Klemanski
(74) *Attorney, Agent, or Firm* — Canon U.S.A., Inc., IP Division

(57) ABSTRACT

The invention provides a colorant compound represented by the following general formula (1):

(1)

wherein $R_1$ and $R_2$ represent independently from each other a species selected from at least one of a hydrogen atom, an alkyl group, and an aralkyl group. $R_3$ represents a species selected from at least one of a hydrogen atom, a cyano group, and —$COR_5$, where $R_5$ is any of a hydroxyl group, an alkoxy group, and an amino group. $R_4$ represents a species selected from at least one of a hydrogen atom, an alkyl group, an aryl group, and an aralkyl group. Cy represents an aryl group. Optionally, at least one anionic group may be present in the general formula (1).

5 Claims, 1 Drawing Sheet

U.S. PATENT DOCUMENTS

| | | | |
|---|---|---|---|
| 7,833,685 B2* | 11/2010 | Tanaka et al. | 534/772 |
| 2004/0231558 A1* | 11/2004 | Kohgo et al. | 106/31.48 |
| 2009/0075193 A1* | 3/2009 | Murai et al. | 534/772 |
| 2010/0035171 A1* | 2/2010 | Watanabe et al. | 430/108.23 |
| 2010/0075098 A1* | 3/2010 | Luecke et al. | 534/772 |

OTHER PUBLICATIONS

John J. Ritter, P. Paul Minieri, "A New Reaction of Nitriles. I. Amides from Alkenes and Mononitriles", J. Am. Chem. Soc., 4045-4048, Dec. 1948.

* cited by examiner

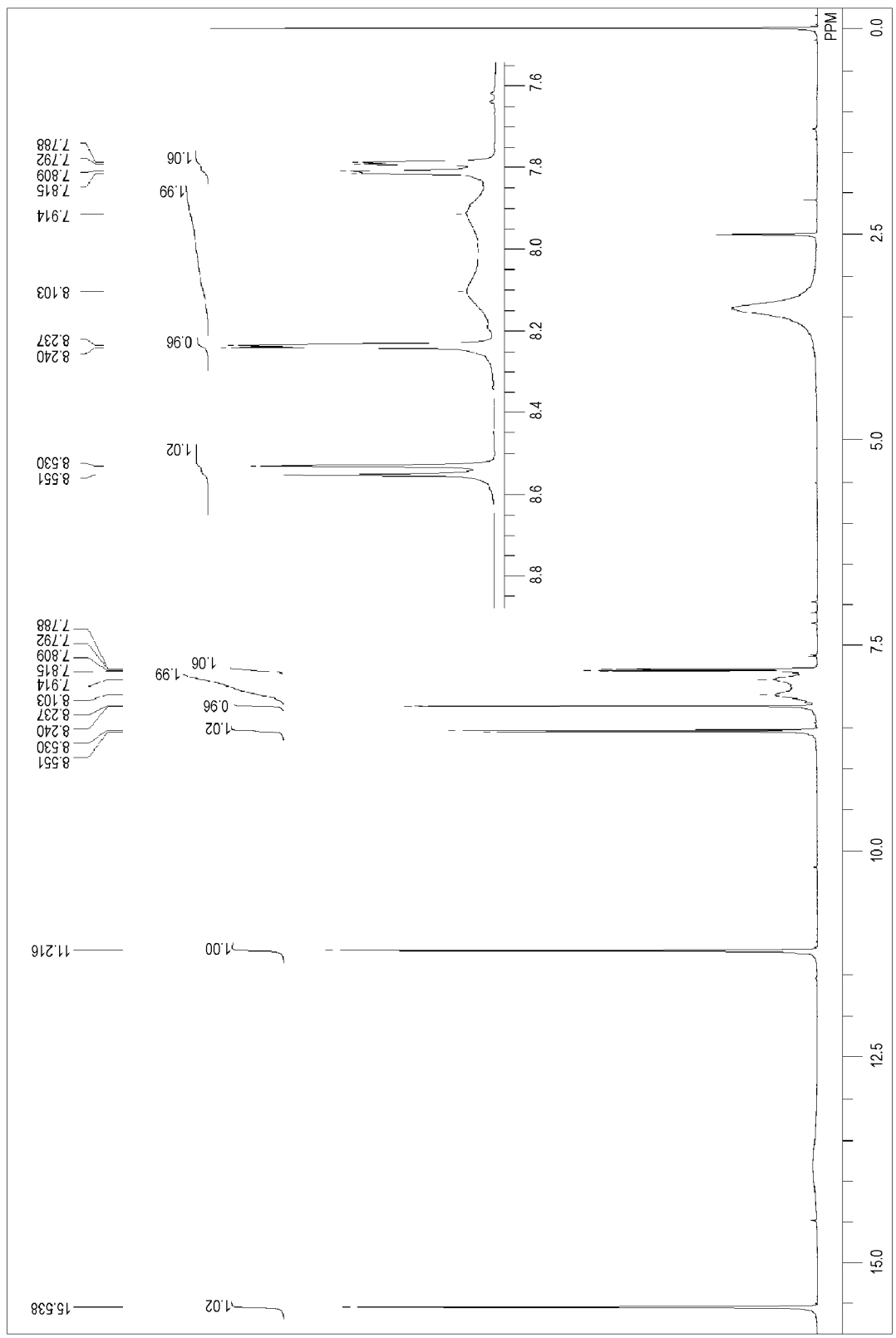

COLORANT COMPOUND AND INK INCLUDING THE COLORANT COMPOUND

BACKGROUND OF THE INVENTION

1. Field of the Invention

The present invention relates to a colorant compound and an ink including the colorant compound.

2. Description of the Related Art

Water-soluble dyes are generally used as colorants in ink jet recording liquids (inks), but a problem associated with recorded images formed by inks including water-soluble dyes is that the images have poor stability in storage. Thus, problems are associated with discoloration of images caused by solar light or various types of illumination light (light fastness) or discoloration of images caused by oxidizing gases (ozone, $NO_x$, $SO_x$) contained in very small amounts in the atmosphere (gas resistance). Furthermore, when photographic images or the like are outputted, problems are associated with color developing ability.

A pyridone azo colorant compound has been suggested as a water-soluble yellow dye for ink jet recording with the object of resolving the above-described problems (Published Japanese translation of a PCT patent application No. 2003-510398). A pyridone azo yellow colorant compound has also been suggested for applications other than inks for ink jet recording (Japanese Patent Laid-Open No. 2006-071822).

SUMMARY OF THE INVENTION

Aspects of the invention provide a colorant compound represented by the following general formula (1):

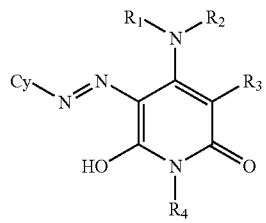

(1)

wherein $R_1$ and $R_2$ represent independently from each other a species selected from at least one of a hydrogen atom, an alkyl group, and an aralkyl group; $R_3$ represents a species selected from at least one of a hydrogen atom, a cyano group, and —$COR_5$, where $R_5$ is any of a hydroxyl group, an alkoxy group, and an amino group; $R_4$ represents a species selected from at least one of a hydrogen atom, an alkyl group, an aryl group, and an aralkyl group; Cy represents an aryl group; and optionally at least one anionic group may be present in the general formula (1).

Aspects of the invention also provide an aqueous ink including the colorant compound represented by the general formula (1), in particular an ink-jet ink.

In accordance with aspects of the invention, a colorant compound with good color development ability, light fastness and gas resistance is provided. Furthermore, in accordance with aspects of the invention, by using the colorant compound having the structure represented by the general formula (1) as a coloring agent for ink, it is possible to provide an ink, in particular an ink-jet ink, capable of forming images that excel in light fastness and gas resistance and have good color tone.

Further features of the present invention will become apparent from the following description of exemplary embodiments with reference to the attached drawings.

BRIEF DESCRIPTION OF THE DRAWINGS

FIG. 1 shows a $^1$H NMR spectrum (400 MHz, DMSO-$d_6$, room temperature) of the colorant compound (D-1) in accordance with aspects of the invention.

DETAIL DESCRIPTION OF THE EMBODIMENTS

The examination conducted by the inventors demonstrated that the colorant compound disclosed in Published Japanese translation of a PCT patent application No. 2003-510398 has insufficient color development ability and weather resistance. The colorant compound disclosed in Japanese Patent Laid-Open No. 2006-071822 has poor solubility in water and, therefore, is not suitable for ink-jet inks.

The invention resolves the above-described problems of the related art and provides a colorant compound with good color development ability, light fastness, and gas resistance. Further, the invention provides an ink that forms images with excellent light fastness and gas resistance and good color tone when used as ink-jet ink.

Aspects of the invention will be described below in greater detail on the basis of exemplary embodiments thereof.

The inventors have conducted comprehensive research aimed at the resolution of the above-described problems of the related art. The results demonstrated that a colorant compound represented by the following general formula (1) forms images that excel in light fastness and gas resistance and have good color tone. This finding led to the creation of the invention.

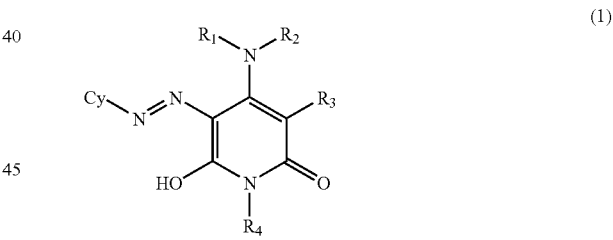

(1)

wherein $R_1$ and $R_2$ represent independently from each other a species selected from at least one of a hydrogen atom, an alkyl group, and an aralkyl group; $R_3$ represents a species selected from at least one of a hydrogen atom, a cyano group, and —$COR_5$, where $R_5$ is any of a hydroxyl group, an alkoxy group, and an amino group); $R_4$ represents a species selected from at least one of a hydrogen atom, an alkyl group, an aryl group, and an aralkyl group; Cy represents an aryl group; and optionally, at least one anionic group may be present in the general formula (1).

The alkyl group in $R_1$ and $R_2$ in the general formula (1) is not particularly limited, and examples thereof include linear, branched, or cyclic alkyl groups having 1 to 20 carbon atoms such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, a cyclopropyl group, a cyclobutyl group, and a cyclopentyl group.

The aralkyl group in $R_1$ and $R_2$ in the general formula (1) is not particularly limited, and examples thereof include a benzyl group and a phenethyl group.

The substituents represented by $R_1$ and $R_2$ in the general formula (1) may have a substituent which is not particularly limited, provided that water solubility or stability in storage of the colorant compound is not substantially degraded. Examples of suitable substituents include an alkyl group such as a methyl group, an ethyl group, an n-propyl group, an isopropyl group, an n-butyl group, an isobutyl group, a sec-butyl group, and a tert-butyl group; an aryl group such as a phenyl group, a naphthyl group, a pyridyl group, a triazinyl group, and a benzothiazolyl group; an alkoxy group such as a methoxy group, an ethoxy group, and a butoxy group; an aryloxy group such as a phenoxy group and a naphthyloxy group; an amino group such as a methylamino group, an ethylamino group, a dimethylamino group, an N-ethyl-N-phenylamino group, and a diphenylamino group; an acyl group such as an acetyl group and a benzoyl group; a carboxylic acid group; a sulfonic acid group; a carbamoyl group; a sulfamoyl group; a nitro group; and a halogen atom such as a fluorine atom, a chlorine atom, a bromine atom, and a iodine atom.

$R_1$ and $R_2$ of general formula (1) can be independently and randomly selected from the substituents listed above and hydrogen atom. Examples thereof are presented below. Thus, any substituent selected from a hydrogen atom and an alkyl group having 1 to 4 carbon atoms may be provided. It may also be the case that either of $R_1$ and $R_2$ may be a hydrogen atom; such a selection may be provided from the standpoint of light fastness and ozone resistance.

Examples of $R_3$ in the general formula (1) include a hydrogen atom, a cyano group, and —$COR_5$ ($R_5$ is any from a hydroxyl group, an alkoxy group, and an amino group). The alkoxy group of $R_5$ is not particularly limited, and examples thereof include a methoxy group, an ethoxy group, a butoxy group, a phenoxy group, and a naphthoxy group. The amino group is not particularly limited and examples therefore include an unsubstituted amino group, a methylamino group, an ethylamino group, an n-propylamino group, an isopropylamino group, an n-butylamino group, a sec butylamino group, a tert-butylamino group, an n-pentylamino group, an isopentylamino group, a neopentylamino group, a tert-pentylamino group, an n-hexylamino group, a 2-ethylhexylamino group, a cyclopenylamino group, a cyclohexylamino group, a cycloheptylamino group, an N,N-dimethylamino group, an N,N-diethylamino group, an N,N-methyl(n-propyl) amino group, a benzylamino group, and an anilino group. It may be the case that $R_3$ is a cyano group, a carbamoyl group, or a carboxylic acid ester group because such a selection ensures excellent color tone, light fastness, and ozone resistance.

The alkyl group in $R_4$ in the general formula (1) is not particularly limited, and examples thereof include linear, branched, or cyclic alkyl groups having 1 to 20 carbon atoms such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, a cyclopropyl group, a cyclobutyl group, and a cyclopentyl group.

The aryl group in $R_4$ in the general formula (1) is not particularly limited, and examples thereof include a phenyl group, a naphthyl group, an anthracenyl group, and a thienyl group.

The aralkyl group in $R_4$ in the general formula (1) is not particularly limited, and examples thereof include a benzyl group and a phenethyl group.

The substituent represented by $R_4$ in the general formula (1) may further have a substituent which is not particularly limited, provided that water solubility or stability in storage of the colorant compound is not substantially degraded. Examples of suitable substituents include an alkyl group such as a methyl group, an ethyl group, an n-propyl group, an isopropyl group, an n-butyl group, an isobutyl group, a sec-butyl group, and a tert-butyl group; an aryl group such as a phenyl group, a naphthyl group, a pyridyl group, a triazinyl group, and a benzothiazolyl group; an alkoxy group such as a methoxy group, an ethoxy group, and a butoxy group; an aryloxy group such as a phenoxy group and a naphthyloxy group; an amino group such as a methylamino group, an ethylamino group, a dimethylamino group, an N-ethyl-N-phenylamino group, and a diphenylamino group; an acyl group such as an acetyl group and a benzoyl group; a carboxylic acid group; a sulfonic acid group; a carbamoyl group; a sulfamoyl group; a nitro group; a cyano group; a trifluoromethyl group; a hydroxyl group; and a halogen atom such as a fluorine atom, a chlorine atom, a bromine atom, and a iodine atom.

$R_4$ in the general formula (1) may for example be a hydrogen atom, an alkyl group having 1 to 12 carbon atoms, and an aryl group. It may be the case that a hydrogen atom is provided, because excellent color tone, light fastness, and ozone resistance can be obtained.

Cy in the general formula (1) represents an aryl group that may have a substituent. The aryl group is not particularly limited, and specific examples thereof include an aromatic carbocyclic group such as a phenyl group and a naphthyl group and an aromatic heterocyclic group such as an imidazolyl group, a thiazolyl group, an oxazolyl group, a pyrrolyl group, an oxadiazolyl group, a thiadiazolyl group, a pyrazolyl group, a 1,2,3-triazolyl group, a 1,2,4-triazolyl group, a furyl group, a thienyl group, a pyridyl group, a pyrimidinyl group, a pyrazinyl group, a pyridazinyl group, a benzoimidazolyl group, a benzothiazolyl group, and a quinolinyl group.

The substituent represented by Cy in the general formula (1) may further have a substituent which is not particularly limited, provided that water solubility or stability in storage of the colorant compound is not substantially degraded. Examples of suitable substituents include an alkyl group such as a methyl group, an ethyl group, an n-propyl group, an isopropyl group, an n-butyl group, an isobutyl group, a sec-butyl group, and a tert-butyl group; an aryl group such as a phenyl group, a naphthyl group, a pyridyl group, a triazinyl group, and a benzothiazolyl group; an alkoxy group such as a methoxy group, an ethoxy group, and a butoxy group; an aryloxy group such as a phenoxy group and a naphthyloxy group; an amino group such as a methylamino group, an ethylamino group, a dimethylamino group, an N-ethyl-N-phenylamino group, and a diphenylamino group; an acyl group such as an acetyl group and a benzoyl group; a carboxylic acid group; a sulfonic acid group; a carbamoyl group; a sulfamoyl group; a nitro group; a cyano group; a trifluoromethyl group; a hydroxyl group; and a halogen atom such as a fluorine atom, a chlorine atom, a bromine atom, and a iodine atom.

Cy in the general formula (1) can be randomly selected from the above-described substituents, but from the standpoint of light fastness and gas resistance, it may be that Cy is a nitrogen-containing aromatic heterocyclic group or an aromatic carbocyclic group represented by the following general formula (2):

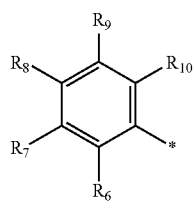

wherein $R_6$ to $R_{10}$ independently represent at least one of a hydrogen atom, a carboxylic acid group, a sulfonic acid group, a carbamoyl group, a sulfamoyl group, a halogen atom, a nitro group, a cyano group, a trifluoromethyl group, a hydroxyl group, an amino group, an alkyl group, and an alkoxy group; and the symbol "*" denotes a position of bonding to a nitrogen atom constituting an azo group in the general formula (1).

At least one from among $R_6$ to $R_{10}$ in the general formula (2) may be a carboxylic acid group or a sulfonic acid group because such a selection increases solubility in aqueous media.

At least one anionic group is present in the general formula (1). The anionic group is not particularly limited, and examples thereof include a carboxylic acid group, a sulfonic acid group, and a phosphoric acid group. Groups with a free hydrogen and groups to which a counter ion has been added are also included. The counter ion is not particularly limited, and examples thereof include alkali metals such as lithium, sodium, and potassium; quaternary ammoniums such as ammonium, methylammonium, dimethylammonium, trimethylammonium, tetramethylammonium, ethylammonium, diethylammonium, triethylammonium, tetraethylammonium, n-propylammonium, isopropylammonium, diisopropylammonium, n-butylammonium, tetra n-butylammonium, isobutylammonium, monoethanolammonium, diethanolammonium, and triethanolammonium. For example, the anionic group may comprise at least one of a carboxylic acid group and a sulfonic acid group, such as a carboxylic acid group and a sulfonic acid group having counter ions such as alkali metal ions such as sodium or potassium and quaternary ammoniums.

A tautomer represented by the general formulas (3) and (4) below is present in the molecular structure represented by the general formula (1). The structure represented by the general formula (1) of the colorant compound in accordance with aspects of the invention also includes the structures represented by the following general formulas (3) and (4):

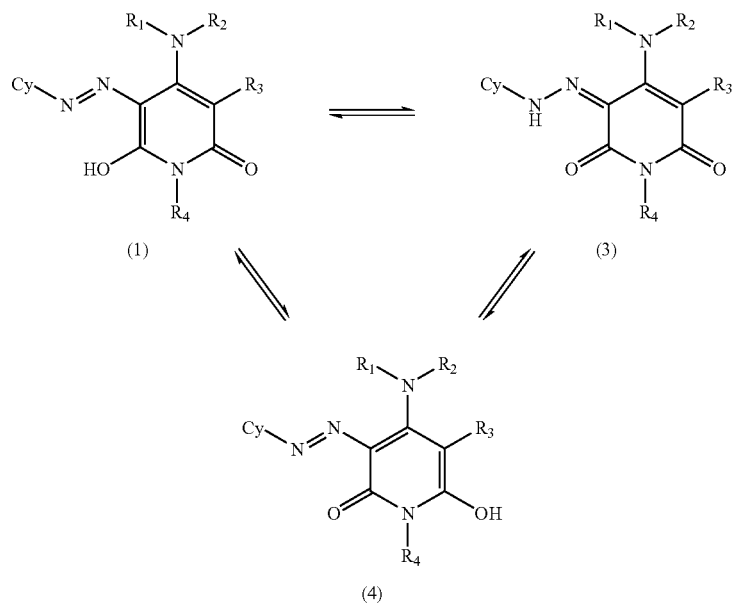

wherein $R_1$ to $R_4$ and Cy in the colorant compounds represented in the general formulae (3) and (4) have the same meaning as $R_1$ to $R_4$ and Cy in the general formula (1).

A method for manufacturing the colorant compound in accordance with aspects of the invention that has the structure represented by the general formula (1) will be described below.

The colorant compound in accordance with aspects of the invention that is represented by the general formula (1) can be synthesized by a well-known method. An example of the synthesis scheme is shown below.

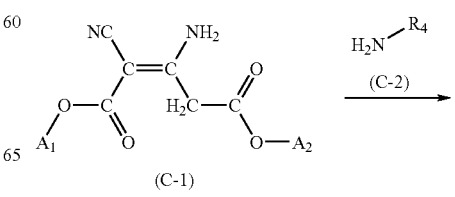

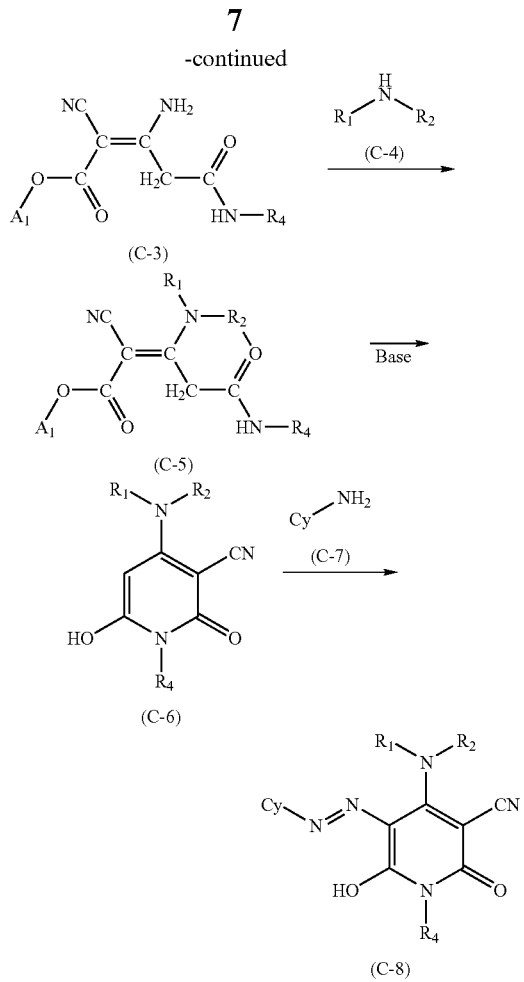

wherein $A_1$ and $A_2$ in the general formulas (C-1) to (C-8) represent any detached group, and $R_1$, $R_2$, $R_4$, and Cy have the same meaning as $R_1$, $R_2$, $R_4$, and Cy in the general formula (1).

A process 1 of amidization of the compound (C-1) with the amine represented by the general formula (C-2) will be explained below. $A_1$ and $A_2$ in the compound represented by the general formula (C-1) that is used in accordance with aspects of the present invention are not particularly limited, but it may be the case that $A_1$ and $A_2$ are independently selected from a methyl group or an ethyl group; with such a selection, the compound can be easily purchased. Many types of the amines represented by the general formula (C-2) are marketed and can be easily purchased. Specific but not limiting examples thereof include ammonia, methylamine, ethylamine, propylamine, butylamine, pentylamine, hexylamine, octylamine, nonylamine, decylamine, undecylamine, dodecylamine, tridecylamine, tetradecylamine, pentadecylamine, hexadecylamine, heptadecylamine, octadecylamine, nonadecyalmine, cyclopropylamine, cyclobutylamine, cyclopentylamine, 5-aminovaleric acid, aniline, 4-aminobenzoic acid, naphthylamine, anthracenylamine, aminothiophene, benzylamine, and phenethylamine.

The present process can be conducted without a solvent, but it may also be that a solvent be present. The solvent is not particularly limited, provided that that it does not hinder the reaction. Examples of suitable solvents include water, methanol, ethanol, dimethylformamide, chloroform, tetrahydrofuran, and toluene. Two or more solvents can be used in a mixture, and a mixing ratio in a case they are used in a mixture can be set at random. The amount of the reaction solvent used is within a range of 0.1 to 1000 times by weight, such as 0.5 to 500 times by weight, and even 1.0 to 150 times by weight, based on the compound (C-1).

The reaction temperature of the process is within a range of −80° C. to 250° C., such as −50° C. to 200° C., and even −20° C. to 150° C. The reaction is usually completed within 24 h.

Upon completion of the reaction, a compound represented by the general formula (C-3) can be obtained by a recrystallization method or a reprecipitation method by using water or methanol.

A process 2 of aminization of the compound represented by the general formula (C-3) with an amine represented by the general formula (C-4) will be explained below. Many types of the amines represented by the general formula (C-4) are marketed and can be easily purchased. Specific but not limiting examples thereof include ammonia, methylamine, ethylamine, propylamine, butylamine, pentylamine, hexylamine, octylamine, nonylamine, decylamine, undecylamine, dodecylamine, tridecylamine, tetradecylamine, pentadecylamine, hexadecylamine, heptadecylamine, octadecylamine, nonadecyalmine, cyclopropylamine, cyclobutylamine, cyclopentylamine, 5-aminovaleric acid, N,N-dimethylamine, N,N-diethylamine, N,N-methylpropylamine, benzylamine, and phenethylamine.

The present process can be conducted without a solvent, but it may also be that a solvent is present. The solvent is not particularly limited, provided that it does not hinder the reaction. Examples of suitable solvents include water, methanol, ethanol, dimethylformamide, chloroform, tetrahydrofuran, and toluene. Two or more solvents can be used in a mixture, and a mixing ratio in a case they are used in a mixture can be set at random. The amount of the reaction solvent used is within a range of 0.1 to 1000 times by weight, such as 0.5 to 500 times by weight, and even 1.0 to 150 times by weight, based on the compound (C-3).

The reaction temperature of the process is within a range of −80° C. to 250° C., such as −50° C. to 200° C., and even −20° C. to 150° C. The reaction is usually completed within 24 h.

Upon completion of the reaction, a compound represented by the general formula (C-5) can be obtained by a recrystallization method or a reprecipitation method by using water or methanol.

A process 3 of cyclization of the compound represented by the general formula (C-5) and synthesis of the compound represented by the general formula (C-6) will be explained below.

The present process can be conducted without a solvent, but it may also be that a solvent may be present. The solvent is not particularly limited, provided that that it does not hinder the reaction. Examples of suitable solvents include water, methanol, ethanol, dimethylformamide, chloroform, tetrahydrofuran, and toluene. Two or more solvents can be used in a mixture, and a mixing ratio in a case they are used in a mixture can be set at random. The amount of the reaction solvent used is within a range of 0.1 to 1000 times by weight, such as 0.5 to 500 times by weight, and even 1.0 to 150 times by weight, based on the compound (C-5).

The reaction temperature of the process is within a range of −80° C. to 250° C., such as −50° C. to 200° C., and even −20° C. to 150° C. The reaction is usually completed within 24 h.

In the present process, if necessary, the reaction rate is increased by adding a base. Specific examples of the base that can be used in the present process include metal alkoxides such as potassium tert-butoxide, sodium tert-butoxide, sodium methoxide, and sodium ethoxide; organic bases such as piperidine, pyridine, 2-methylpyridine, diethylamine, triethylamine, isopropylethylamine, potassium acetate and 1,8-diazabicyclo[5,4,0]undeca-7-ene; and inorganic bases such as sodium hydrogen hydride, metallic sodium, sodium hydride, and sodium carbonate. For example, the base may be at least one of potassium tert-butoxide, sodium methoxide, sodium ethoxide, and piperidine, such as at least one of sodium methoxide and piperidine. The amount of the base used is 1 to 15 mol, such as 1.1 to 8 mol, and even 1.2 to 4 mol per 1 mol of the compound represented by the general formula (C-5).

Upon completion of the reaction, a compound represented by the general formula (C-6) can be obtained by a recrystallization method or a reprecipitation method by using water or methanol.

Various methods can be used for converting the cyano group in the general formula (C-6) into substituents represented by $R_3$ in the general formula (1). For example, hydrolysis or a Ritter reaction (J. J. Ritter and P. P. Minieri, J. Am. Chem. Soc., 70, 4045 (1948)) can be used.

A process 4 of forming an azo bond and producing a colorant will be described below. The process 4 can be implemented by a well-known method. Thus, a colorant compound represented by the general formula (C-8) is obtained by coupling a diazo component derived from an amine derivative represented by the general formula (C-7) and a compound represented by the general formula (C-6). For example, the below-described method can be used as a specific coupling method. First, the amine derivative represented by the general formula (C-7) is reacted with a diazonating agent such as sodium nitrite in the presence of an inorganic acid such as hydrochloric acid or sulfuric acid to convert the derivative into a corresponding diazonium salt. Then, the diazonium salt is coupled to the compound represented by the general formula (C-6) to produce the colorant compound represented by the general formula (C-8).

The obtained compounds represented by the general formulae (C-3), (C-5), (C-6), and (C-8) can be isolated and purified by the usual methods used for isolating and purifying organic compounds. For example, the reaction liquid is made acidic with hydrochloric acid or the like, solids are filtered off by acid precipitation, neutralization with sodium hydroxide or the like is conducted, and subsequent concentration produces a crude product. The crude product is then recrystallized using acetone or methanol and purified by column purification using silica gel. A high-purity product can be obtained by conducting purification by using the above-described methods individually or in combination.

The above-described manufacturing method makes it possible to synthesize the colorant compound represented by general formula (1) below. Colorant compounds (D-1) to (D-29) are presented as specific examples of the colorant compound in accordance with aspects of the invention in Tables 1 and 2, but these examples are not limiting. In the colorant compounds (D-1) to (D-29), $R_1$, $R_2$, $R_3$, $R_4$, and Cy in general formula (1) below are substituents presented in Tables 1 and 2.

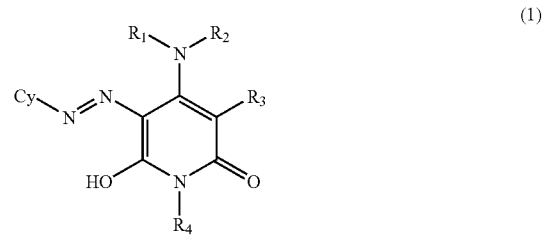

(1)

TABLE 1

Colorant compounds in accordance with aspects of the invention

| Compound Number | Cy | $R_1$ | $R_2$ | $R_3$ | $R_4$ |
|---|---|---|---|---|---|
| D-1 | 4-methyl-3-COONa-phenyl-SO₃Na | —H | —H | —CN | —H |
| D-2 | 3-methyl-2-CF₃-6-COONa-phenyl | —C₂H₅ | —H | —CN | —H |
| D-3 | 4-methyl-3-COONa-phenyl-SO₃Na | —C₂H₅ | —H | —CN | —H |
| D-4 | 4-methyl-3-COONa-phenyl-OH | —CH₂-phenyl | —H | —CN | —H |

TABLE 1-continued

Colorant compounds in accordance with aspects of the invention

| Compound Number | Cy | $R_1$ | $R_2$ | $R_3$ | $R_4$ |
|---|---|---|---|---|---|
| D-5 | 4-methyl-3-COONa-phenyl-SO$_3$Na | -CH$_2$-C$_6$H$_5$ | —H | —CN | —H |
| D-6 | 4-methyl-3-COONa-phenyl-NO$_2$ | -(CH$_2$)$_4$-C(=O)-ONa | —H | —CN | —H |
| D-7 | 4-methyl-3-COONa-phenyl-SO$_3$Na | -(CH$_2$)$_4$-C(=O)-ONa | —H | —CN | —H |
| D-8 | 4-methyl-3-COONa-phenyl-SO$_3$Na | —H | —H | —H | —H |
| D-9 | 4-methyl-3-COONa-phenyl-CONH$_2$ | —H | —H | —H | —H |
| D-10 | 4-methyl-3-COONa-phenyl-SO$_3$Na | —H | —H | —COOC$_2$H$_5$ | —H |
| D-11 | 4-methyl-3-COONa-phenyl-SO$_2$NH$_2$ | —H | —H | —COOC$_2$H$_5$ | —H |
| D-12 | 3-methyl-2-COONa-phenyl-OCH$_3$ | —H | —H | —CONH$_2$ | —H |
| D-13 | 4-methyl-3-COONa-phenyl-SO$_3$Na | —H | —H | —CONH$_2$ | —H |

TABLE 1-continued

Colorant compounds in accordance with aspects of the invention

| Compound Number | Cy | $R_1$ | $R_2$ | $R_3$ | $R_4$ |
|---|---|---|---|---|---|
| D-14 | 3,5-dichloro-2-methyl-benzoate (COONa); Cl, Cl substituents | —H | —H | —C(O)NH—CH(CH$_3$)—C$_6$H$_4$—SO$_3$Na | —H |
| D-15 | 4-methyl-3-carboxylate benzene with SO$_3$Na (COONa, SO$_3$Na) | —H | —H | —C(O)NH—CH(CH$_3$)—C$_6$H$_4$—SO$_3$Na | —H |

TABLE 2

Colorant compounds in accordance with aspects of the invention

| Compound Number | Cy | $R_1$ | $R_2$ | $R_3$ | $R_4$ |
|---|---|---|---|---|---|
| D-16 | 4-methyl-3-COONa-phenyl-SO$_3$Na | —H | —H | —CN | —C$_2$H$_5$ |
| D-17 | 3,5-dimethyl-1-(3-sulfonatophenyl)pyrazole (NaO$_3$S) | —H | —H | —CN | —C$_2$H$_5$ |
| D-18 | 2-methyl-5-methyl-benzoate (COONa) | —H | —H | —CN | —CH$_2$—C$_6$H$_5$ |
| D-19 | 4-methyl-3-COONa-phenyl-SO$_3$Na | —H | —H | —CN | —CH$_2$—C$_6$H$_5$ |
| D-20 | 4-methyl-3-COONa-phenyl-SO$_3$Na | —H | —H | —CN | —CH$_2$CH$_2$CH$_2$CH$_2$—C(O)ONa |

TABLE 2-continued

Colorant compounds in accordance with aspects of the invention

| Compound Number | Cy | $R_1$ | $R_2$ | $R_3$ | $R_4$ |
|---|---|---|---|---|---|
| D-21 | 6-methyl-2-(sodiooxycarbonyl)pyridin-yl | —H | —H | —CN | —(CH$_2$)$_4$C(O)ONa pentanoate chain |
| D-22 | 2-methylbenzothiazol-6-yl sulfonate (SO$_3$Na) | —H | —H | —CN | 4-methylphenyl |
| D-23 | 2-methyl-5-sulfo(SO$_3$Na)-benzoate (COONa) phenyl | —H | —H | —CN | 4-methylphenyl |
| D-24 | 3-methyl-1,5-bis(SO$_3$Na)naphthyl | —H | —H | —CN | —H |
| D-25 | 8-methyl-5-(SO$_3$Na)quinolinyl | —H | —H | —CN | —H |
| D-26 | 2-methyl-4-methyl(CH$_3$)-phenyl with SO$_3$Na | —H | —H | —CN | —H |
| D-27 | 3-methyl-1,4-bis(SO$_3$Na)phenyl | —H | —H | —CN | —H |
| D-28 | 2-methyl-4-(SO$_2$Na)-benzoate(COONa)phenyl | —C$_2$H$_5$ | —H | —CN | —C$_2$H$_5$ |
| D-29 | 2-methyl-4-(SO$_2$Na)-benzoate(COONa)phenyl | —CH$_3$ | —CH$_3$ | —CN | —C$_2$H$_5$ |

The colorant compound in accordance with aspects of the invention has a bright color tone, and spectral characteristics thereof enable the use as a coloring agent, for example as a coloring agent for recording image information. This application is described below in greater detail.

Ink

The colorant compound in accordance with aspects of the invention has a bright color tone and excellent spectral characteristic thereof enables the use as a coloring agent for yellow ink and as a color adjusting agent for intermediate (red or green) color ink or black ink, in particular as a material for recording image information. More specifically, the colorant compound in accordance with aspects of the invention can be advantageously used as a material (color material) for ink for ink jet recording and also printing ink, and ink for coating material and writing utensils.

A method for manufacturing an ink that contains a colorant compound in accordance with aspects of the present invention that can be advantageously used as ink for ink jet recording will be explained below. An ink composition that can be used as ink can be produced by dissolving or dispersing the colorant compound represented by the general formula (1) in a liquid medium. It may be the case that an aqueous medium is used as the liquid medium. When ink for ink jet recording is produced, it may be that the colorant compound is contained in an amount within a range of equal to or greater than 0.2 parts by mass and equal to or less than 10 parts by mass in 100 parts by mass of the ink.

Water or a mixed medium of water and a water-soluble organic solvent can be used as the aforementioned aqueous medium. The water-soluble organic solvent that can be used in this case is not particularly limited, provided that it is soluble in water. Examples of suitable solvents include alcohol, polyhydric alcohols, polyglycols, glycol ethers, nitrogen-containing polar solvents, and sulfur-containing polar solvents. With consideration for preservation of moisture-retaining ability of the ink, improvement of coloring material dissolution ability, and effective permeation of the ink into the recording paper, it may be that the water-soluble organic solvent is contained in the ink at a ratio within a range of equal to or greater than 1 mass % and equal to or less than 40 mass %, such as equal to or greater than 3 mass % and equal to or less than 30 mass % based on the entire ink. It may also be that the content of water in the ink is within a range of equal to or greater than 30 mass % and equal to or less than 95 mass % based on the entire ink. With such ratios, it is possible to improve dispersivity or solubility of the coloring material including the colorant compound in accordance with aspects of the invention in the ink. In particular, a viscosity that enables stable ink discharge can be obtained and clogging of nozzle tips can be prevented when the ink is used for ink jet recording.

A chemically synthesized surfactant such as an ionic surfactant, a non-ionic surfactant or a polymer surfactant can be used as a constituent component of the ink including the colorant compound in accordance with aspects of the present invention. Surfactants derived from natural products and obtained by modification thereof with enzymes or the like can be also used. These surfactants may be used individually or in combination. With the object of maintaining good dispersion stability of the colorant compound in accordance with aspects of the present invention, it may be that the total content of the surfactant in the ink is equal to or more than 0.5 mass % and equal to or less than 20 mass % based on the entire ink.

The type of the surfactant is not particularly limited. Examples of suitable ionic surfactants include anionic surfactants such as aliphatic monocarboxylic acid salts, polyoxyethylene alkyl ether carboxylic acid salts; N-acyl sarcosine salts, N-acylglutamic acid salts, dialkylsulfosuccinic acid salts; alkanesulfonic acid salts, alpha-olefinsulfonic acid salts, straight-chain or branched alkylbenzenesulfonic acid salts, naphthalenesulfonic acid salt formaldehyde condensates, alkylnaphthalenesulfonic acid salts; N-methyl-N-acyltauric acid salts; polyoxyethylene alkyl ether sulfuric acid salts, oil-and-fat sulfuric acid ester salts; alkylphosphoric acid salts, polyoxyethylene alkyl ether phosphoric acid salts, and polyoxyethylene alkylphenyl ether phosphoric acid salts; cationic surfactants such as alkylamine salts, alkyltrimethylammonium chloride, alkyltrimethylammonium bromide, or alkyltrimethylammonium iodide, dialkyldimethylammonium chloride, dialkyldimethylammonium bromide, or dialkyldimethylammonium iodide, alkylbenzalconium chloride, and alkylpyridinium chloride; amphoteric surfactants such as alkylbetaines, fatty acid amidopropylbetaines, 2-alkyl-N-carboxymethyl-N-hydroxyethyl imidazolinium betaines, alkyl or dialkyldiethylenetriamine acetic acids, and alkylamineoxides.

Examples of nonionic surfactants include glycerin fatty acid esters, sorbitan fatty acid esters, sugar fatty acid esters; polyoxyethylene alkyl ethers, polyoxyethylene alkyl phenyl ethers, polyoxyethylene polyoxypropylene glycol; fatty acid polyethylene glycol, fatty acid polyoxyethylene sorbitan, and fatty acid alkanolamides.

Examples of polymeric surfactants include anionic polymers such as polyacrylic acid salts, styrene—acrylic acid copolymer salts, vinyl naphthalene—acrylic acid copolymer salts, styrene—maleic acid copolymer salts, vinyl naphthalene—maleic acid copolymer salts, and polyphosphoric acid; and nonionic polymers such as polyvinyl alcohol, polyvinyl pyrrolidone, and polyalkylene glycol.

Examples of surfactants derived from natural products and obtained by modification thereof with enzymes or the like include proteins such as gelatin and casein; natural gums such as Arabia gum; glucoside, e.g. saponin, cellulose derivatives such as alkylcellulose, carboxyalkylcellulose, and hydroxyalkylcellulose; ligninsulfonic acid salts; natural polymers such as shellac, and surfactants for food products, such as lecithin and fermented lecithin.

A pH value of ink when the ink is manufactured using the colorant compound in accordance with aspects of the present invention is not particularly limited, but from the standpoint of handleability a range of pH 4.0-11.0 may be provided. When ink for ink jet recording is produced, a moisture-retaining solid component such as urea, a urea derivative, and trimethylolpropane may be used as an ink component to maintain the moisture-retaining ability of the ink. The content of the moisture-retaining solid component such as urea, an urea derivative, and trimethylolpropane in the ink may be within a range of equal to or greater than 0.1 mass % to equal to or less than 20.0 mass %, such as equal to or greater than 3.0 mass % and equal to or less than 10.0 mass %.

When ink is produced, various kinds of additives may be added, if necessary, to the above-described components, examples of the additives including a pH adjusting agent, a corrosion inhibitor, a preservative, an antimold agent, an antioxidant, a reduction preventing agent, an evaporation enhancer, a chelating agent, and a water-soluble polymer.

As described hereinabove, the ink prepared using the colorant compound in accordance with aspects of the invention can be especially advantageously used in an ink jet recording system in which recording is conducted by ejecting droplets by the action of thermal energy. The colorant compound in accordance with aspects of the invention can be also used as ink suitable for other ink jet recording methods and materials for general writing utensils or the like. Furthermore, the colorant material in accordance with aspects of the present invention is not limited to applications as a coloring agent and can find applications as an electronic material such as a colorant for optical recording or a colorant for a color filter.

EXAMPLES

Aspects of the invention will be explained below in greater detail by examples thereof, but the invention is not limited to the examples. In the text below, "part" and "%" stands by parts by mass and mass %, unless stated otherwise. The reaction products obtained are identified by a plurality of analytical methods using the below-described devices. Thus, the analytical devices used include: $^1$H nuclear magnetic resonance spectral analyzer (ECA-400, manufactured by JEOL Ltd.), high-speed liquid chromatograph (LC-20A, manufactured by Shimadzu Corp.), LC/TOF MS (LC/MSD TOF, Agilent Technologies Inc.), UV/Vis spectral photometer (U-3310 Spectral Photometer, manufactured by Hitachi, Ltd.).

Example 1

Synthesis Example 1

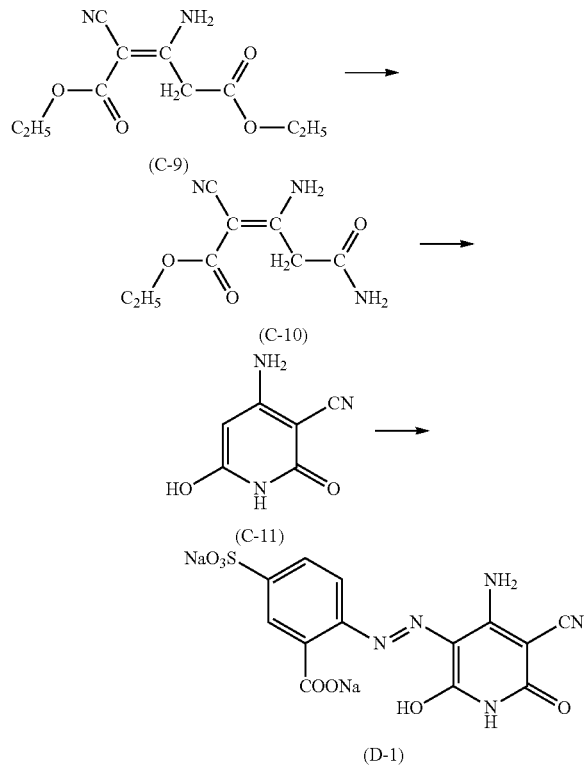

First, the compound (C-10) was synthesized by using the compound (C-9). A total of 189 parts of water having 74 parts of ammonia dissolved therein were added to 196 parts of the compound (C-9) and stirring was conducted for 6 h at room temperature. Upon completion of the reaction, the reaction liquid was concentrated and solids precipitated by a recrystallization method were filtered off to obtain 144 parts (yield 85%) of the compound (C-10).

The compound (C-11) was then synthesized using the obtained compound (C-10). A total of 338 parts of ethanol and 34 parts of sodium ethoxide were added to 32 parts of the compound (C-10) and stirring was conducted for 5 h at a temperature of 80° C. Upon completion of the reaction, the reaction liquid was concentrated and solids precipitated by a recrystallization method were filtered off to obtain 20 parts (yield 80%) of the compound (C-11).

The compound (D-1) was then synthesized using the obtained compound (C-11). A total of 15 parts of 5-sulfo anthranylic acid and 7.3 parts of 35% aqueous solution of hydrochloric acid were added to 200 parts of water, followed by stirring and then cooling to a temperature of equal to or less than 5° C. A total of 5.3 parts of sodium nitrite was then added, stirring was conducted for 1 h, and then 2.0 parts of amidosulfuric acid was added, the excess sodium nitrite present in the reaction liquid was decomposed, and an aqueous solution of diazonium salt was added. A total of 10.4 parts of the compound (C-11) was separately suspended in 100 parts of water. The above-described aqueous solution of diazonium salt was then gradually dropwise added so at to maintain the suspension at a temperature of equal to or lower than 5° C., and stirring was further conducted for 2 h at a temperature of 0 to 5° C. Upon completion of the reaction, the pH was adjusted with hydrochloric acid to a value equal to or less than 1, and the precipitated solids were filtered. The solids obtained were then dispersed in 200 mL of water, neutralized with an aqueous solution of sodium hydroxide and dissolved. The aqueous solution obtained was demineralized by electrodialysis and then crystallized from acetone to obtain 24 parts (yield 92%) of the target compound (D-1). Analysis conducted with the above-described devices confirmed that the compound obtained had the above-described structure. The analysis results are presented below.

[Analysis Results for the Colorant Compound (D-1)]

[1] $^1$H NMR (400 MHz, DMSO-d$_6$, room temperature): δ [ppm]=15.54 (1.0H, s), 11.22 (1.0H, s), 8.54 (1.0H, d), 8.24 (1.0H, d), 8.10-7.91 (2.0H, br), 7.80 (1.0H, d); the results are shown in FIG. 1.

[2] Mass analysis (ESI-TOF): m/z=399.99 (M-Na)$^-$.

[3] HPLC results: purity=99.4 area %, holding time 7.40 min (0.1 mM, TFA solution-MeOH).

[4] UV/Vis spectral analysis: $\lambda_{max}$=420.5 nm.

Synthesis Example 2

Synthesis of Colorant Compound (D-3)

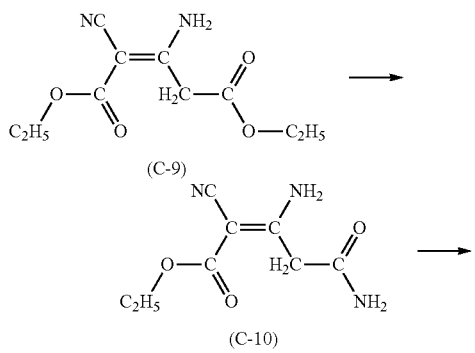

21
-continued

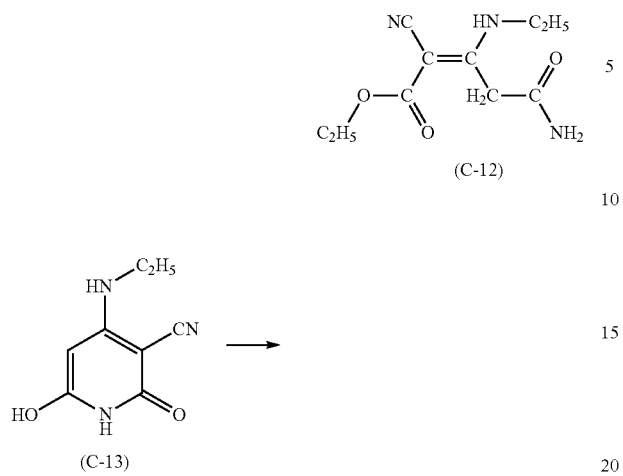

22
Synthesis Example 3

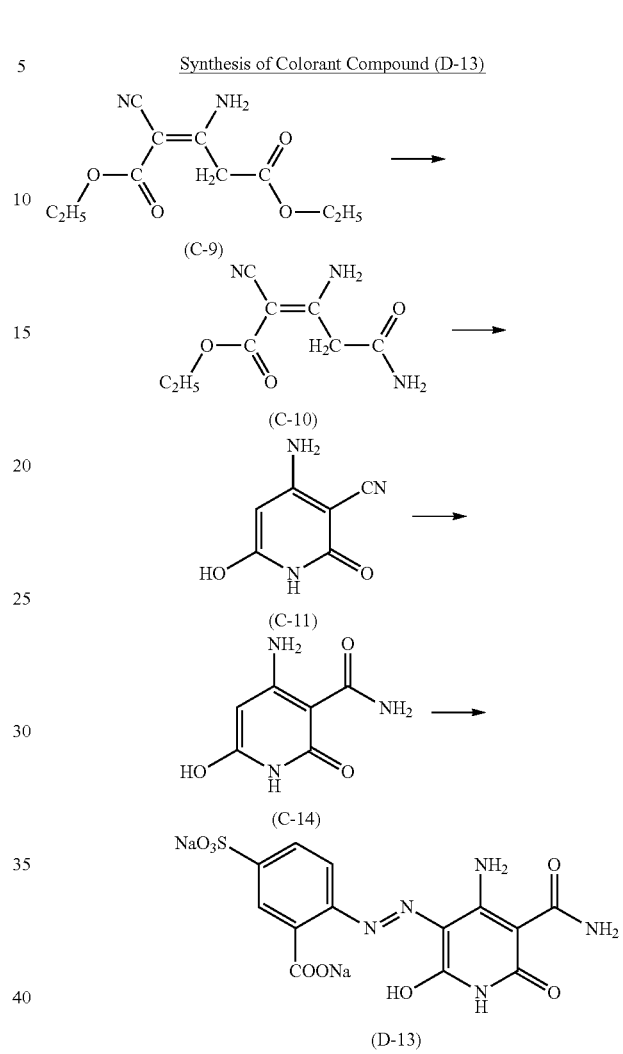

The compound (C-10) was synthesized by using the compound (C-9) by the same method as was used in the Synthesis Example 1.

The compound (C-12) was synthesized using the obtained compound (C-10). A total of 11 parts of ethylamine and 23 parts of water were added to 10 parts of the compound (C-10) and stirring was conducted for 10 h at room temperature. Upon completion of the reaction, the reaction liquid was concentrated, and solids precipitated by a recrystallization method were filtered off to obtain 9 parts (yield 82%) of the compound (C-13).

Subsequent cyclization, colorant formation, and purification processes were conducted by the same methods as in the Synthesis Example 1, except that the compound (C-13) was used instead of the compound (C-10), and the target compound (D-3) was obtained.

Analysis conducted with the above-described devices confirmed that the compound obtained had the above-described structure. The analysis results are presented below.

[Analysis Results for the Colorant Compound (D-3)]

[1] $^1$H NMR (400 MHz, DMSO-$d_6$, room temperature): δ [ppm]=16.75 (1.0H, s), 10.94 (1.0H, s), 8.29 (1.0H, d), 8.13 (1.0H, s), 7.92 (1.0H, t), 7.63 (1.0H, d), 3.80 (2.0H, m), 1.28 (3.0H, t).

[2] Mass analysis (ESI-TOF): m/z=428.03 (M-Na)$^-$.

[3] HPLC results: purity=99.2 area %, holding time 10.6 min (0.1 mM, TFA solution-MeOH).

[4] UV/Vis spectral analysis: $\lambda_{max}$=413.5 nm.

The compound (C-11) was synthesized by using the compound (C-9) by the same method as was used in the Synthesis Example 1.

The compound (C-14) was used using the obtained compound (C-11). A total of 50 parts (80%) of sulfuric acid was added to 10 parts of the compound (C-11) and stirring was conducted for 10 h at a temperature of 85° C. Upon completion of the reaction, the reaction liquid was poured over 500 parts of ice and solids precipitated by a recrystallization method were filtered off to obtain 8.9 parts (yield 79%) of the compound (C-14).

Subsequent colorant formation and purification processes were conducted by the same methods as in the Synthesis Example 1, except that the compound (C-14) was used instead of the compound (C-11), and the target compound (D-13) was obtained. Analysis conducted with the above-described devices confirmed that the compound obtained had the above-described structure. The analysis results are presented below.

[Analysis Results for the Colorant Compound (D-13)]

[1] $^1$H NMR (400 MHz, DMSO-$d_6$, room temperature): δ [ppm]=16.69 (1.0H, s), 10.63 (1.0H, s), 10.47 (1.0H, s), 9.06 (1.0H, s), 8.28 (1.0H, s), 8.14 (1.0H, d), 7.92 (1.0H, s), 7.63 (1.0H, d), 7.04 (1.0H, s).

[2] Mass analysis (ESI-TOF): m/z=418.00 (M-Na)⁻.

[3] HPLC results: purity=99.5 area %, holding time 8.2 min (0.1 mM, TFA solution-MeOH).

[4] UV/Vis spectral analysis: $\lambda_{max}$=416.0 nm.

Other Synthesis Examples

Colorant compounds (D-2), (D-4) to (D-12), (D-14) to (D-29) presented in Tables 1 and 2 were obtained according to the methods described in Synthesis Examples 1-3.

Example 2

Ink Preparation Example 1

A total of 3.5 parts of the colorant compound (D-1) was added to 1 part of Acetylenol EH (manufactured by Kawaken Fine Chemical Co.), 7.5 part of ethylene glycol, 7.5 parts of glycerin, and 7.5 parts of urea, and ion-exchange water was then added to obtain a total of 100 parts. The components were then thoroughly stirred and dissolved to produce ink (I-1).

Ink Preparation Examples 2 to 11

Inks (I-2) to (I-10) were prepared in the same manner as described above, except that the colorant compound (D-1) used in Ink Preparation Example 1 was replaced with colorant compounds (D-3), (D-8), (D-10), (D-13), (D-15), (D-16), (D-23), (D-27), and (D-28), respectively.

Comparative Ink Preparation Examples 1 and 2

Comparative inks (I-11) and (I-12) were prepared in the same manner as described above, except that the colorant compound (D-1) used in Ink Preparation Example 1 was replaced with comparative colorant compounds (E-1) and (E-2), respectively.

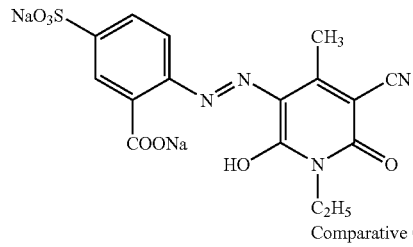

Comparative Compound (E-1)

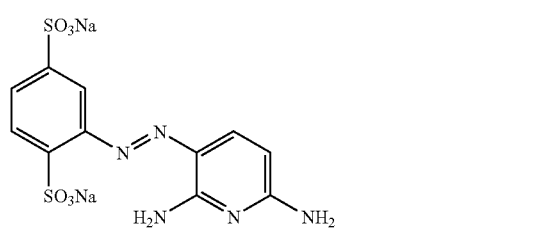

Comparative Compound (E-2)

<Evaluation>

Inks (I-1) to I-10) obtained in Ink Preparation Examples 1 to 11 and comparative inks (I-11) and (I-12) obtained in Comparative Ink Preparation Examples 1 and 2 were loaded in ink cartridges of an ink jet printer Pixus iP8600 manufactured by Canon Inc. Then, prints were produced by printing solid images in the form of squares with a side of 2 cm on glossy professional photopaper (PR-101) manufactured by Canon Inc. The prints with eight gradations were also produced by printing images in the form of squares with a side of 2 cm so that the ink discharge amount was 80, 60, 50, 40, 25, and 20% with respect to that during solid image printing. The prints were naturally dried for 24 h to obtain prints for evaluation.

[Color Tone]

The obtained prints with eight color tones were analyzed with SpectroLino (Gretag Macbeth Co). Chromaticity (L*, a*, b*) was measured in the L*a*b* color system. The chroma (c*) was calculated by the following formula on the basis of measured values of color properties.

$$\text{Chroma } (c^*) = \sqrt{\{(a^*)^2 + (b^*)^2\}}$$

The evaluation was conducted in the following manner by using the value of L* at c*=100. Color tone was determined to be good when L* was equal to or greater than 85.

A: L* is equal to or greater than 90.

B: L* is equal to or greater than 85 and less than 90.

C: L* is less than 85.

[Light Fastness]

The prints obtained were placed in an Atlas Weather-Ometer (Ci4000, manufactured by Toyo Seiki Seisakusho) and exposed for 50 h. The measurement conditions in this case were as follows: Black Panel: 50° C., Chamber: 40° C., Rel. Humidity: 70%, and Irradiance (340 nm): 0.39 W/m². The test paper was analyzed with SpectroLino (Gretag Macbeth Co.) before and after the irradiation. Optical density and chromaticity in the L*a*b* color system were measured. A color difference (ΔE) was calculated by the following formula on the basis of measured value of color properties.

$$\text{Color difference } (\Delta E) = \sqrt{\{(a^*(\text{before the test}) - a^*(\text{after the test}))^2 + (b^*(\text{before the test}) - b^*(\text{after the test}))^2 + (L^*(\text{before the test}) - L^*(\text{after the test}))^2\}}.$$

The evaluation was conducted in the following manner. Light fastness was determined to be good when ΔE was less than 10.

A: ΔE is less than 5.

B: ΔE is equal to or greater than 5 and less than 10.

C: ΔE is equal to or greater than 10.

[Gas Resistance]

The prints obtained were placed in an ozone weather-meter (OMS-H, manufactured by Suga Shikenki KK) and exposed for 4 h under an atmosphere with an ozone concentration of 10 ppm, a temperature of 24° C., and a relative humidity of 60%. The reflection density of the prints was also measured before and after the test. The results obtained were estimated based on criteria similar to those of the light fastness test. A color difference (ΔE) was calculated by the following formula on the basis of measured value of color properties.

$$\text{Color difference } (\Delta E) = \sqrt{\{(a^*(\text{before the test}) - a^*(\text{after the test}))^2 + (b^*(\text{before the test}) - b^*(\text{after the test}))^2 + (L^*(\text{before the test}) - L^*(\text{after the test}))^2\}}.$$

The evaluation was conducted in the following manner. Gas resistance was determined to be good when ΔE was less than 10.

A: ΔE is less than 5.

B: ΔE is equal to or greater than 5 and less than 10.

C: ΔE is equal to or greater than 10.

Types of the colorants used in the inks and evaluation results relating to color tone, light fastness, and gas resistance are shown in Table 3.

TABLE 3

| Ink No. | Compound number | Color tone | Light fastness | Gas resistance |
|---|---|---|---|---|
| I-1 | D-1 | A | A | A |
| I-2 | D-3 | A | A | A |
| I-3 | D-8 | A | A | A |
| I-4 | D-10 | A | A | A |
| I-5 | D-13 | A | A | A |
| I-6 | D-15 | A | A | A |
| I-7 | D-16 | A | A | A |
| I-8 | D-23 | B | B | A |
| I-9 | D-27 | A | A | A |
| I-10 | D-28 | A | B | A |
| I-11 | E-1 | A | C | B |
| I-12 | E-2 | C | B | C |

Table 3 confirms that the inks using the colorant compounds in accordance with aspects of the invention had good color tone, light fastness, and gas resistance and, therefore, these colorant compounds are useful for inks.

The colorant compound in accordance with aspects of the invention is suitable for various applications. Thus, the colorant compound is not limited to applications as a coloring agent and can find applications as an electronic material such as a colorant for optical recording or a colorant for a color filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-265178, filed Oct. 14, 2008, which is hereby incorporated by reference herein in its entirety.

What is claimed is:

1. An ink for ink jet recording comprising an aqueous medium and a colorant compound represented by a general formula (1) below:

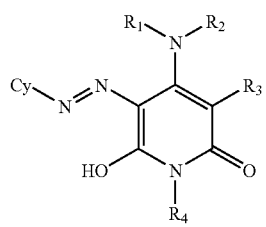

(1)

wherein $R_1$ and $R_2$ represent independently from each other a species selected from the group consisting of a hydrogen atom, an alkyl group, and an aralkyl group;

$R_3$ represents a species selected from the group consisting of a hydrogen atom, a cyano group, and —$COR_5$, where $R_5$ is a species selected from the group consisting of a hydroxyl group, an alkoxy group, and an amino group;

$R_4$ represents a species selected from the group consisting of a hydrogen atom, an alkyl group, an aryl group, and an aralkyl group;

Cy represents an aryl group; and at least one anionic group may be present in the general formula (1).

2. The ink according to claim 1, wherein Cy in the general formula (1) is represented by a following general formula (2):

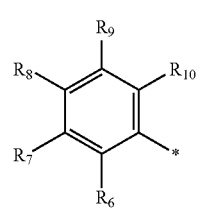

(2)

wherein $R_6$ to $R_{10}$ independently represent a species selected from the group consisting of a hydrogen atom, a carboxylic acid group, a sulfonic acid group, a carbamoyl group, a sulfamoyl group, a halogen atom, a nitro group, a cyano group, a trifluoromethyl group, a hydroxyl group, an amino group, an alkyl group, and an alkoxy group; and the symbol "*" denotes a position of bonding to a nitrogen atom constituting an azo group in the general formula (1).

3. The ink according to claim 1, wherein Cy in the general formula (1) is a nitrogen-containing heterocyclic group.

4. The ink according to claim 1, wherein $R_1$ and $R_2$ in the general formula (1) are each a hydrogen atom.

5. The ink according to claim 1, wherein $R_4$ in the general formula (1) is a hydrogen atom.

* * * * *